Feb. 17, 1970 E. J. EMANUELS 3,496,294

CONVERTOR FOR TRANSMITTING UNINTERRUPTED MORSE CODE SIGNALS

Filed Sept. 26, 1966 6 Sheets-Sheet 1

INVENTOR.
ERWIN J. EMANUELS

BY Hugh A. Kirk

ATT'Y.

Feb. 17, 1970 E. J. EMANUELS 3,496,294

CONVERTOR FOR TRANSMITTING UNINTERRUPTED MORSE CODE SIGNALS

Filed Sept. 26, 1966 6 Sheets-Sheet 2

INVENTOR.
ERWIN J. EMANUELS

BY Hugh A Kirk

ATT'Y.

INVENTOR
ERWIN J. EMANUELS
BY Hugh A. Kirk
ATT'Y.

INVENTOR.
ERWIN J. EMANUELS

BY Hugh A. Kirk
ATT'Y.

Feb. 17, 1970 E. J. EMANUELS 3,496,294

CONVERTOR FOR TRANSMITTING UNINTERRUPTED MORSE CODE SIGNALS

Filed Sept. 26, 1966 6 Sheets-Sheet 5

INVENTOR.
ERWIN J. EMANUELS

BY Hugh A. Kirk

ATT'Y

CONVERTOR FOR TRANSMITTING UNINTERRUPTED MORSE CODE SIGNALS

Filed Sept. 26, 1966 6 Sheets-Sheet 6

| 5 UNIT CODE | | | | | WHEATSTONE CODE | | | |
|---|---|---|---|---|---|---|---|---|
| O | O | | | | A | • — | - | — • • • • — |
| O | | | O | O | B | — • • • | ? | • • — — • • |
| | O | O | O | | C | — • — • | : | — — — • • • |
| O | | | O | | D | — • • | | |
| O | | | | | E | • | 3 | • • • — — |
| O | | O | O | | F | • • — • | | |
| | O | | O | O | G | — — • | | |
| | | O | | O | H | • • • • | | |
| | O | O | | | I | • • | 8 | — — — • • |
| O | O | | O | | J | • — — — | ⍾ | |
| O | O | O | O | | K | — • — | ( | — • — — • — |
| | O | | | O | L | • — • • | ) | — • — — • — |
| | | O | O | O | M | — — | . | • — • — • — |
| | | O | O | | N | — • | , | — — • • — — |
| | | | O | O | O | — — — | 9 | — — — — • |
| | O | O | | O | P | • — — • | 0 | — — — — — |
| O | O | O | | O | Q | — — • — | 1 | • — — — — |
| | O | | O | | R | • — • | 4 | • • • • — |
| O | | O | | | S | • • • | ' | • — — — — • |
| | | | | O | T | — | 5 | • • • • • |
| O | O | O | | | U | • • — | 7 | — — • • • |
| | O | O | O | O | V | • • • — | = | — • • • — |
| O | O | | | O | W | • — — | 2 | • • — — — |
| O | | O | O | O | X | — • • — | / | — • • — • |
| O | | O | | O | Y | — • — — | 6 | — • • • • |
| O | | | | O | Z | — — • • | + | • — • — • |
| O | O | O | O | O | LETTERS | | | |
| O | O | | O | O | FIGURES | | | |
| | | | O | | CARRIAGE RETURN | | | |
| | O | | | | LINE FEED | | | |
| | | O | | | SPACE | | | |

FIG. 4

INVENTOR.
ERWIN J. EMANUELS
BY Hugh A. Kirk
ATT'Y.

United States Patent Office 3,496,294

Patented Feb. 17, 1970

3,496,294

CONVERTOR FOR TRANSMITTING UNINTERRUPTED MORSE CODE SIGNALS

Erwin Jacob Emanuels, Leidschendam, Netherlands, assignor to De Staat der Nederlanden, ten Deze Vertegenwoordigd Door de Directeur-Generaal der Posterijen, Telegrafie en Telefonie, The Hague, Netherlands Filed Sept. 26, 1966, Ser. No. 581,808
Claims priority, application Netherlands, Sept. 27, 1965, 6512472
Int. Cl. H04f 15/04
U.S. Cl. 178—79 16 Claims

ABSTRACT OF THE DISCLOSURE

An apparatus for converting international telegraph alphabet in five unit code signals, such as from a perforated tape, into uninterrupted Morse code alphabet signals comprising a reader, a five unit memory, a code converter, a shift register, and an output keyer all connected to and controlled by a program processor circuit which is in turn controlled by a clock pulse generator controlled distributor, so that the five unit code signals which do not occur in the Morse code are automatically ignored without causing any mutilations or interruptions in the keyer's output. Also this apparatus includes means for automatically generating space signals between the letters of the Morse code signals in place of the first detected signal to be ignored whether a sole signal is to be ignored or a series of such signals. The number of signals which can be ignored without interruption resulting therefrom in the Morse code text depends upon the last convertible signal transmitted and is usually equal to the number of bits in the Morse code signal minus one, since each shift of the shift register according to each bit of the Morse code signal can cause another five unit code to be read by the reader and tested for its convertibilty or its ignoration. In normal practice this number is sufficient so that practically no interruptions will occur.

RELATED APPLICATIONS

Netherlands priority application Ser. No. 651247 filed Sept. 27, 1965.

BACKGROUND OF THE INVENTION

The international telegraph alphabet No. 2 or Murray teleprinter alphabet contains some signals which do not occur in the Morse code, such as "carriage return," "line feed," "figures," "letters," the so-called shift signals, and the figures positions of the signals "D," "F," "G," "H" and "J" (see table in FIG. 4).

These teleprinter code signals have no equivalent in the Morse code. If in known systems two or several of such signals occur in succession they are converted to 0-bits, so that the Morse code text is not a true representation of the text fed in. This addition of 0-bits causes difficulties for an operator to take such a message converted into Morse code.

SUMMARY OF THE INVENTION

A device for implementing the process according to the invention comprises an automatic Morse code transmitter or keyer fed by a perforated tape similar to that used for teleprinted traffic, the signals perforated in this tape in the five-units code (international telegraph alphabet No. 2) being scanned by a five units tape reader and converted into the Wheatstone Morse code.

The five-units teleprinter code comprises several signals, termed shift signals, such as "letters," "figures," "carriage return," "line feed," and further the figures positions of the letters "D," "F," "G," "H" and "J," which do not occur in the Wheatstone Morse code. Thus in a teleprinter message, lines will always end in the combination "carriage return," "line feed," "letters."

In the process according to the invention, the said shift signals and the further signals mentioned are recognized and ignored without interruption or mutilation of the transmitted Morse-code text occurring. Ignoration, however, must not always take place.

The necessary shift signals transmitted at the transition to a next line in teleprinter traffic generally do not include the "space" signal. If the automatic transmitter ignores all the shift signals, the result will be that the last word of the preceding line and the first word of the following line are transmitted as a whole. This is not a correct representation of the text supplied to the machine. In order to avoid this mutilation in the Morse code text delivered and according to the process of this invention, the space signal is automatically inserted between two words in such a case. Thus if a "line feed" signal occurs once and is not preceded by the "hyphen" or the "space" signal, it is converted as "space."

The conversion of the five-units signals applied to the input terminal into Wheatstone Morse signals is effected by means of logic circuits and time circuits.

Besides giving a visual check, the device provides the possibility of making the output audible.

The Morse code is composed of dots, dashes and spaces. The shortest unit is the dot, which will be called one-bit. A dash consists of three 1-bits. The interval separating dots from dashes, dots from dots or dashes from dashes in one and the same signal is as long as a dot and is called zero-bit. The interval separating two successive signals consists of three 0-bits. The interval separating two successive words consists of seven 0-bits. If e.g. the character "A" (·–) is used in a word, it will comprise eight bits, viz. 10111000. As final letter of a word it consists of twelve bits, viz. 101110000000. The character "0" (zero) has the largest number of bits, viz. twenty-two bits—1110111011101110111000—within a word or figure group and twenty-six—11101110111011101110000000—at the end of a word or figure group. In the automatic transmitter the information is marked per bit. Thus in summary:

1 dot=one 1-bit
1 dash=three 1-bits
Intervals between dots and dashes=one 0-bit
Intervals between signals=three 0-bits
Intervals between words=seven 0-bits The number of shift signals that can be ignored without having any effect on the Morse code text to be transmitted is equal to the total number minus one of the bits making up the last convertible signal preceding the shift signals. For example, the letter "T" is represented in the Morse code by one dash and is transmitted within a word by means of three 1-bits followed by three 0-bits, equalling six bits in all. Accordingly after this letter "T" 6−1=5 shift signals can be ignored without any interruptions occurring in the Morse code text. In normal practice there will generally not occur in succession any more shift signals than this. If, however, a succession of seven shift signals does occur, such will not result in mutilations in the Morse code text because in this case the text will contain two additional 0-bits as described below. However, if among the shift signals to be ignored there appears the "line feed" signal, then the number of signals to be neglected can be more without an interruption occurring in the Morse code text.

If the "line feed" signal occurs once and is not preceded by a "hyphen" or a "space" signal, it is converted as "space" in the Morse code text. In the case of an uninterrupted series of "line feed" signals, only the first of these signals will be converted as "space" and the following signals will be ignored.

If a line terminates e.g. in the letter "E" (in the Morse code one dot) followed by the shift signals "carriage return" and "line feed," there will be only three additional shift signals which will be ignored without any perceptible effect on the Morse code text, since the signal "E" consists of four bits, notably one 1-bit followed by three 0-bits, so that only 4—1=3 shift signals can be ignored thereafter. The "space" signal in the Morse code comprises seven 0-bits. The letter "E" in the Morse code is 1000 in bits. The "carriage return" signal is ignored; the "line feed" signal is converted into "space." It suffices to supplement the number of bits following the 1-bit to seven, so that only 7—3=4 0-bits have to be inserted for the "space" signal. Due to this insertion 4—1=3 additional unconvertible signals can be ignored. (Every character is followed by three 0-bits; if only four 0-bits are added, the condition for the "space" signal, the presence of seven 0-bits has been fulfilled.)

The tape reader is provided with three tape control contacts, $q^1$, $q^2$ and $q^3$ (see FIG. 2*a*) namely tight tape stop, paper contact, and latch closed, respectively.

If these *q*-contacts are not all closed, the device will send "reversals" indicating the reader has run out of tape. If during the tranmission of a traffic signal, one, two or three of the said *q*-contacts are opened, the "reversals" will not be transmitted, before the transmission of this traffic signal and the subsequent "space" has been completed. When all the *q*-contacts are closed, the first signal to be transmitted will be preceded by four 0-bits, in order to prevent the signal from being received multilated and to provide a sufficient separation between the end of the "reversals" and the first Morse code signal to be transmitted.

BRIEF DESCRIPTION OF THE VIEWS

The above mentioned and other features, objects and advantages and a manner of attaining them are described more specifically below by reference to an embodiment of this invention shown in the accompanying drawings, wherein:

FIG. 1 is a schematic block wiring diagram of the Morse code converter according to one embodiment of this invention;

FIGS. 2*a*, 2*b*, 2*c* and 2*d* comprise together a schematic disconnected wiring diagram of the circuit shown in FIG. 1;

FIG. 4 is a table of conversion of a five unit tape code to a Wheatstone Morse code performed by the code converter shown in FIGS. 1, 2*a* and 2*c*.

DETAILED DESCRIPTION OF A PREFERRED EMBODIMENT

The telegraphic speed is continuously adjustable to a maximum of 22 words per minute, i.e. approximately 19 bauds, six signals forming a word, each signal consisting of 8.6 bits on an average.

The maximum signalling speed of the device is only limited by the stepping and reading speed of the tape reader used.

In what follows a description will be given of the device used for carrying out the process according to the invention.

Figure 1:
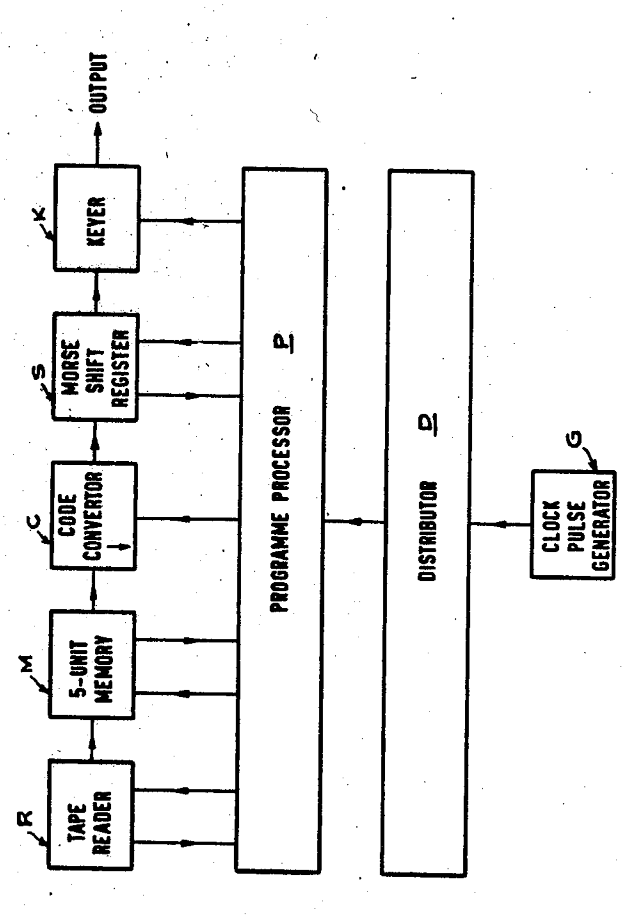

The device consists of the following parts (FIG. 1):

The telegraphic speed adjuster G (clock pulse generator).

The distributor D.

The programme processor P.

The five units memory M.

The code convertor C.

The Morse shift register S.

The keyer K.

Further there is a tape reader R comprising the step magnet SMB (see FIG. 2*a*), the *q*-contacts and the reading station (left sides of FIGS. 2*a* and 2*c*) in which the holes in the perforated tape are scanned.

Figure 2A:
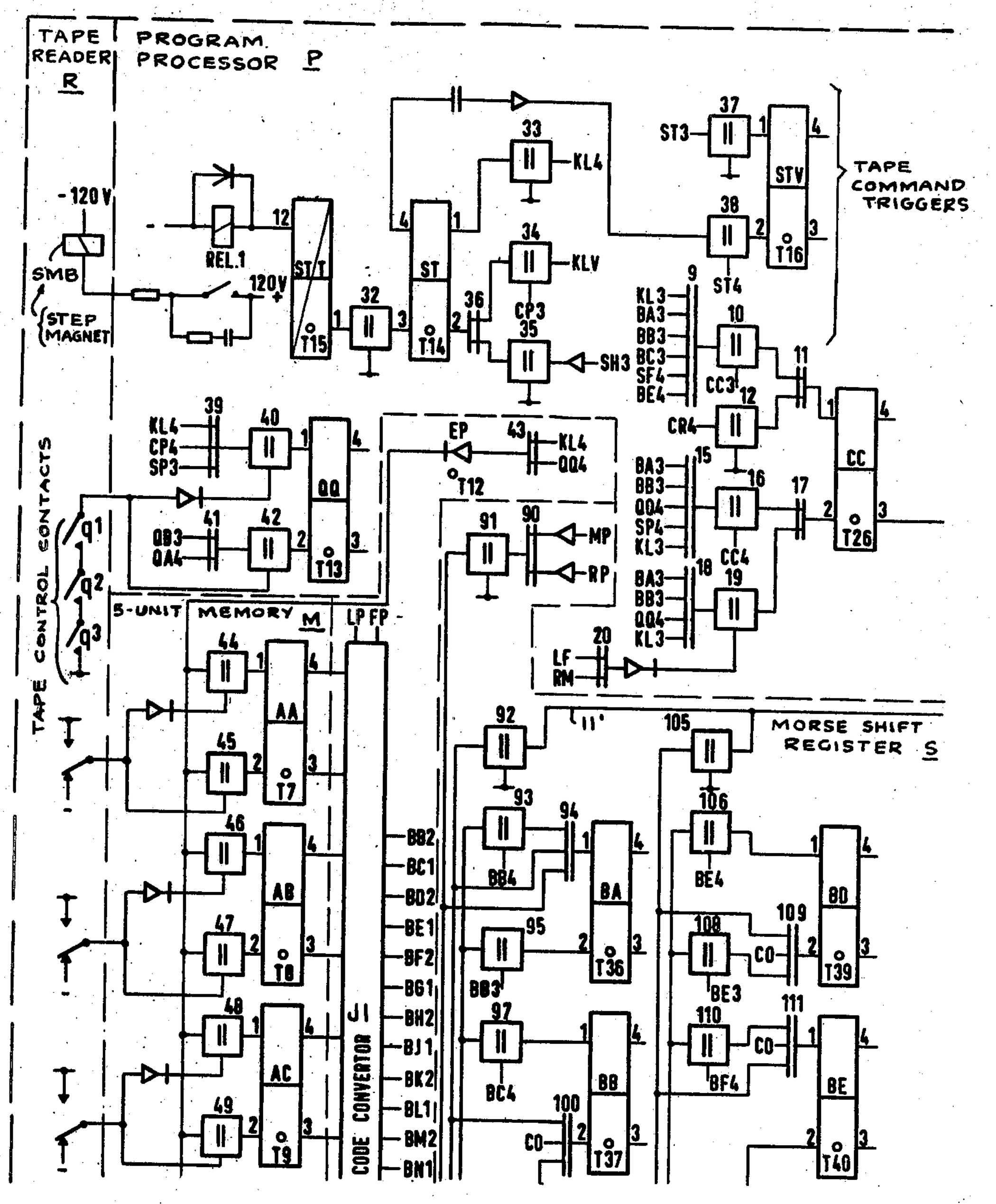
Figure 2B:
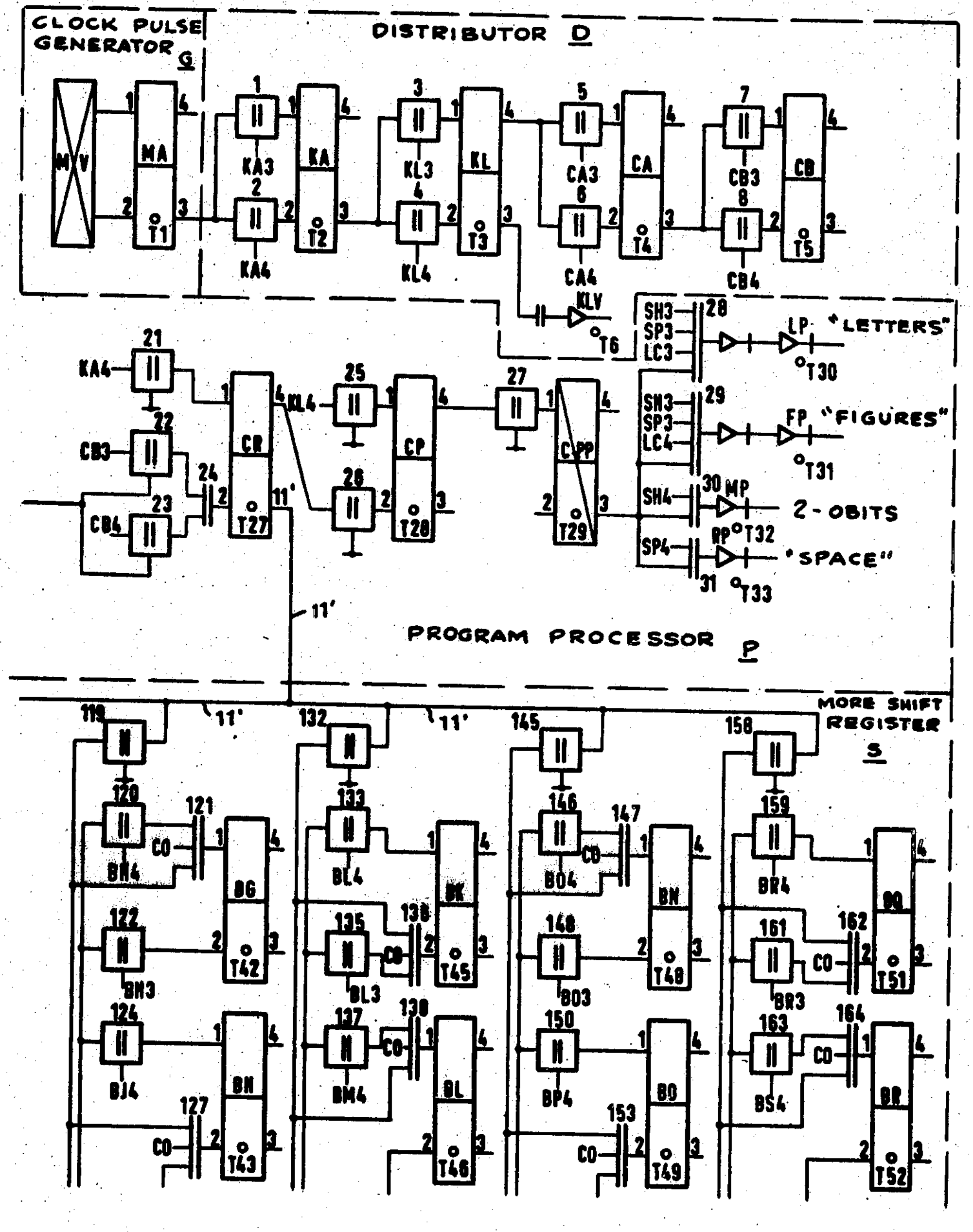
Figure 2C:
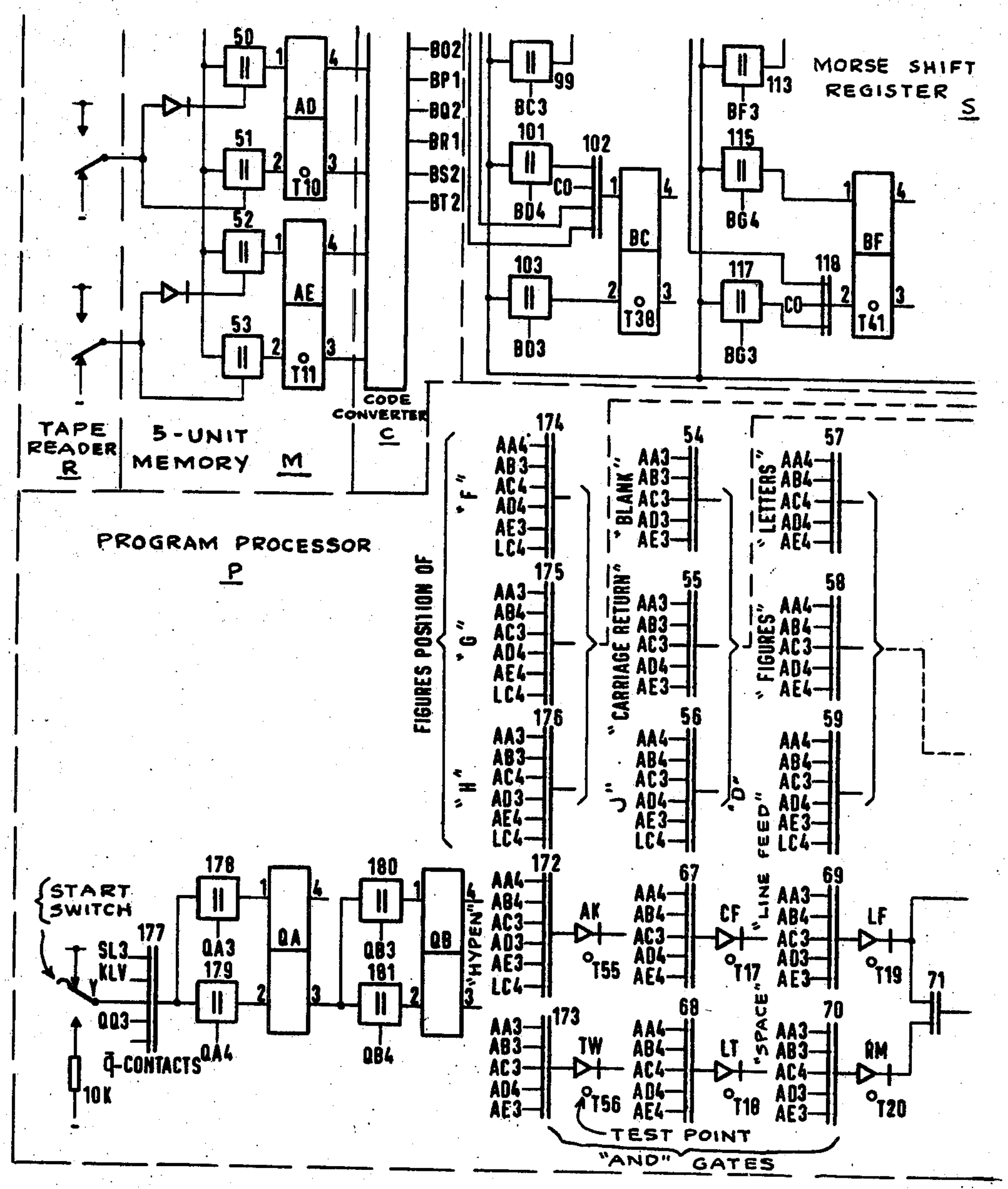
Figure 2D:
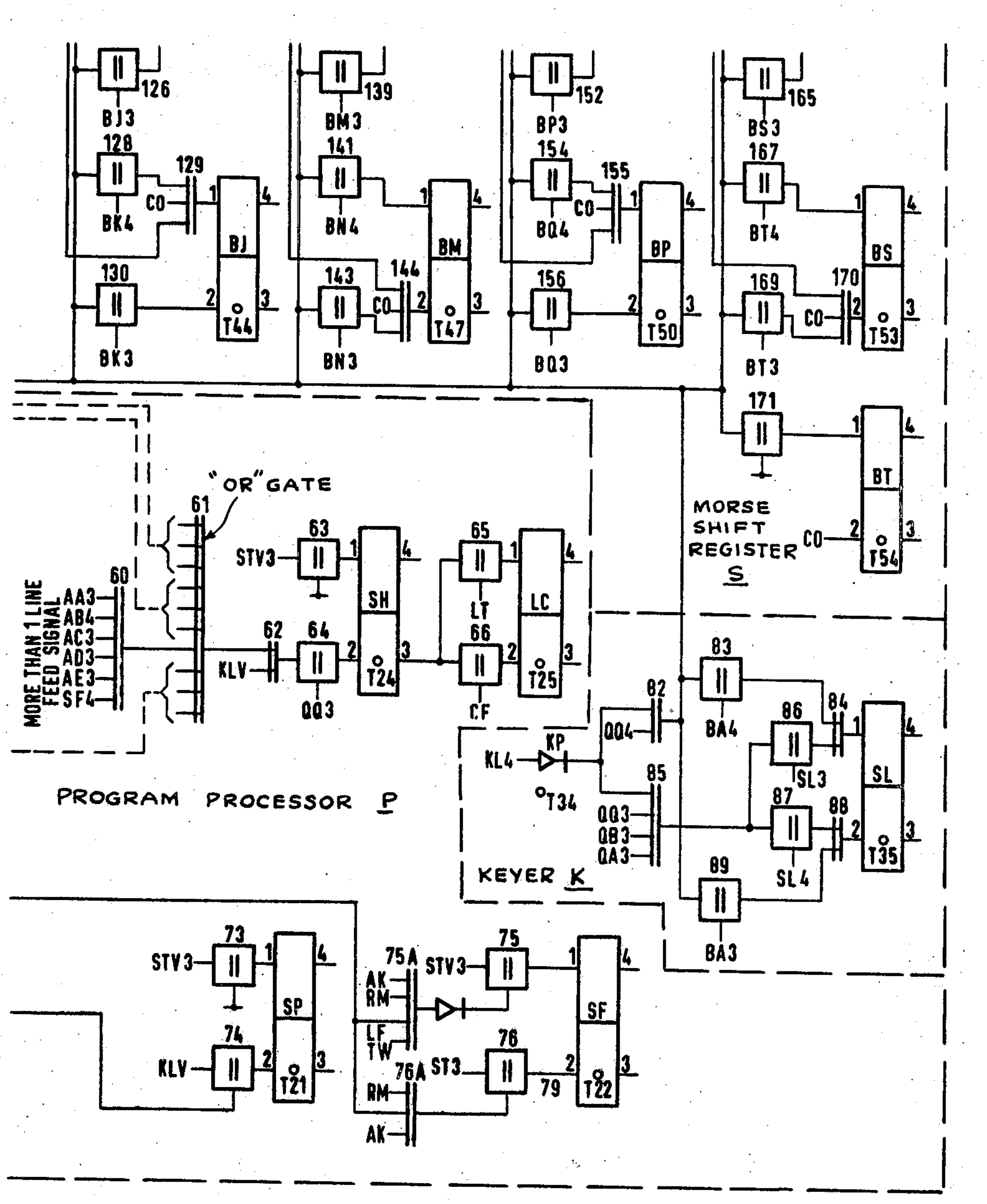

The telegraphic speed adjuster G (FIG. 2*d*)

The multivibrator MV, the frequency of which is continuously adjustable, controls the trigger MA, which delivers the clock pulses to the distributor D.

The distributor D (FIG. 2*b*)

The distributor D is a binary counter network consisting of the triggers KA, KL, CA and CB with input pulse gates 7 through 8. This counting network, controlled by the clock pulses from the trigger MA, can count 16 of these control pulses. Each signal transmitted in the Morse code alphabet always ends in at least three 0-bits and consists of a multiple of two bits. The shortest signal, the letter "E" in the Wheatstone More code, comprises 4 bits, notably one 1-bit and three 0-bits. When dividing a Morse code signal into bits, one sees that the 0-bits between the dots and dashes always occur at the even places and that Wheatstone code signal begins with a 1-bit (see FIG. 4).

Figure 3:
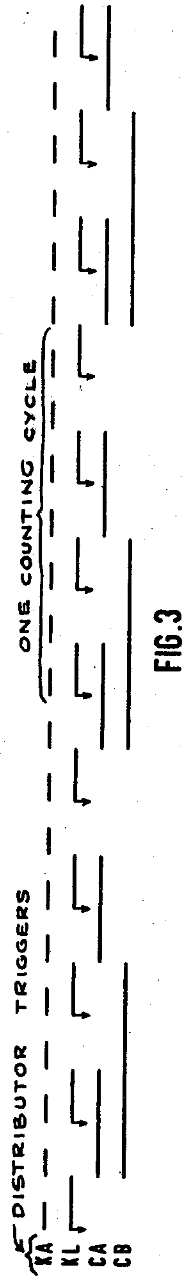
FIG. 3 is a time diagram of the pulses put out by the distributor shown in FIGS. 1 and 2*b* during its counting cycles.

The end of one bit and the beginning of the following is marked by the change-over of the trigger KL to the off-normal state, which trigger KL is in this state four times in a counting-cycle (see FIG. 3).

The trigger CB is in the off-normal state for one-half of a cycle and in the normal state for the other half. This trigger CB marks the multiples of two bits.

The programme processor P (FIG. 2)

The programme processor comprises the triggers CC, CR, CP, CPP, SF, SP, SH, LC, QA, QB and QQ; and tape command triggers ST, STT, and STV.

The trigger CC (FIG. 2*a*) takes the off-normal state, if during the shift pulse both the triggers BA and BB of the shift register S are at normal. The simultaneous normal states of these two triggers BA and BB indicate that there are two successive 0-bits to be transmitted by the keyer K. A signal always ends in more than one 0-bit. So the appearance of a second 0-bit is already an indication that the transmission of a signal has come to an end.

The change-over of the trigger CC indicates that the first of the three 0-bits in which each signal ends is being transmitted by the keyer K (trigger SL).

When trigger CC is in the off-normal state a CB-pulse from the distributor D changes over the trigger CR (FIG. 2b) to the off-normal state. This trigger ensures the preset position of the Morse shift register S via conductor 11'.

After the trigger CR has put the Morse shift register S in the preset position, the triggers CP and CPP introduce the signal supplied in the Wheatstone Morse code through the code convertor C controlled by the "letter" amplifier LP or via the "figure" amplifier FP, into the Morse shift register S. The trigger CP, changed over to the off-normal state, provides the possibility of passing by way of a delayed pulse from the trigger KL and amplifier KLV via the triggers ST and STT (see FIG. 2*a*) a transport command to the tape reader R. Further the programme processor P has two output terminals for adjusting the shift register S; notably, if too many unconvertible signals are supplied, two 0-bits are introduced into the shift register S via the amplifier MP (FIG. 2*b*) for each two unconvertible signals which there are too much or over the number of bits-1 in the prior signal; and if "space" is wanted, the insertion of a "space" signal is effected via the amplifier RP. In both cases four additional 0-bits are stored in the shift register S. In the former case the moment of introduction has been so chosen that of these four 0-bits only the first two are passed on to the keyer K before the keyer proceeds to the transmission of a fresh signal. In the latter case for "space" all the four 0-bits are transmitted.

The "line feed" signal (if not preceded by a "hyphen" or a "space" signal) is converted as "space" by means of the trigger SP (FIG. 2*d*). In the case of an uninterrupted series of "line feed" signals, only the first of these signals will be translated as "space," the subsequent ones being ignored by means of the trigger SF. This trigger SF ascertains that there are more of these signals and a transport command passes via the triggers SH and ST (see FIG. 2*a*) to the step magnet SMB of the tape reader R. If the "line feed" signal is preceded by the "space" or "hyphen" signals, the trigger SF ensures that the "line feed" signal is ignored. In this case the "space" or "hyphen" signal may be followed by some "carriage return" signals.

If the reading station of the tape reader R passes an unconvertible shift signal to the five-units memory, such as, an uninterrupted series of "line feed" signals or one of the blank figure positions for "D," etc. (see FIG. 4), the triggers SH and ST will give an intermediate transport command to the tape reader R.

The five-units memory M (FIGS. 2*a* and 2*c*)

The triggers AA through AE and their input pulse gates 44 through 51 constitute the memory M for the five-units signal scanned in the reading station of the tape reader R. This signal cannot be recorded in these triggers AA through AE, however, until all the *q*-contacts are closed. After this recording, a test is made as to whether the signal can be converted into Wheatstone Morse code. If this is not the case, an intermediate command via the triggers SH and ST will cause the tape to be moved on, thus bringing the next signal into the reading station. This process will be repeated until a convertible signal enters the reading station.

If one of the unconvertible five-units signals is the "letters" or "figures" signal, this signal is recorded in a memory, namely the trigger LC, before the stepping command is given. In the five-units code the same combinations are used for "figures" and "letters"; thus the combination *xoxox* represents the letter "*y*" or the figure "6". If by this combination the letter "*y*" is meant and if the preceding signal was a figure, the said letter combination will be preceded by the "letters" signal, to indicate that all the signals to follow are letters.

A transport command for bringing a fresh signal into the reading station coincides with the beginning of the transmission of a 1-bit; the transfer of the five-units combination from the reading station to the five-units memory M takes place at the moment when the transmission of the next bit commences.

The code convertor C (FIGS. 2*a* and 2*c*)

In the code convertor C the five-units signals originating from the five-units memory are converted into Wheatstone Morse code signals and transferred to the shift register S triggers BA through BT.

The code convertor C consists of two parts, notably one for letters and one for figures etc., which parts can, independently, pass the converted signals to the shift register S.

Via logic circuits and under the control of the amplifier LP or the amplifier FP (see FIG. 2*b*), the "letters/figures" memory trigger LC determines which part will be active.

The code convertor C contains a set of logic circuits the number of which corresponds to the number of signals convertible into Morse signals; for the particular group of non-convertible signals the code convertor contains no circuits. For recording, counting, and if necessary, processing the signals of this particular group the program processor P contains a number of logic circuits and triggers, such as triggers SF and SH.

The Morse shift register S (see FIGS. 2*a*, 2*b*, 2*c* and 2*d*)

The Morse shift register S consists of the triggers BA through BT. The off-normal state of a trigger represents the 1-bit, the normal state corresponding to the 0-bit. The shifting action takes place when the distributor trigger KL (see also downward arrows in FIG. 3) passes to the off-normal state. The code convertor C adjusts the register S according to the Morse code signal to be transmitted.

Before a signal is transferred from the code convertor C to the shift register S, this register S is put in a preset position via conductor 11. When notably the trigger CR operates, the triggers BA, BC, BE, BG, BJ, BL, BN, BP, BR and BT will assume the normal state (0-bit), whereas the triggers BB, BD, BF, BH, BK, BM, BO, BQ and BS take the off-normal state (1-bit).

The following shift pulse (from distributor trigger KL) will shift the information recorded in the trigger BA to the trigger SL, provided the trigger QQ is in the off-normal condition, i.e. the *q*-contacts are closed. (The information stored in the trigger BB goes to BA, the information stored in BC goes to BB, etc.) During the code pulse from the amplifier LP, FP, MP or RP (outputs of trigger CPP (see FIG. 2*b*)), the shift register triggers BA, BB, etc. will be adjusted according to the Morse code signal to be transmitted. This is done during the transmission, by the keyer trigger SL, of the last 0-bit of the Morse signal preceding the signal stored in the register. If the letter "Q" represented by the 16 bits *xxxoxxxoxoxxxooo* is to be transmitted, the code convertor C needs to supply only four bits, viz. three 1-bits (triggers BB, BF and BM) and one 0-bit (trigger BP).

The shift register S consists of 19 triggers, one for each bit. The figure "0", however, consists of 19+3=22 bits. Consequently, in this case the last three bits (necessary space after each signal) cannot be placed in the register S. When the shifting process is carried on, however, the trigger BT (the last register trigger) will assume the normal state. Therefore it is not necessary to register the last three bits, which are always 0-bits of such a 22-bits signal, because the shift register S delivers these 0-bits following every shift pulse from the trigger KL.

If during the shift pulse KL (see downward arrows in FIG. 3) both the triggers BA and BB are at normal, this means the end of a signal. In this case three 0-bits are transmitted. Thus it is no more necessary to transfer the last three 0-bits of any signal from the code convertor to the shift register S. An exception is formed by the "space" signal, since after the said three 0-bits four additional 0-bits have to be transmitted in that case, which transmission is ensured by the trigger SP (see FIG. 2*d*).

As has been mentioned each signal ends in three 0-bits. At the moment when the shift registers delivers the last of these three 0-bits to the keyer K, the transport command is given to the tape reader R. During the transmission of this 0-bit the next signal is transferred to the shift registers. The signal present in the reading station had already been taken over by the five-units memory M. The fresh signal to be transmitted is transferred to the shift registers, under the control of the programme processor P, during the transmission of the last 0-bit of the preceding signal. Consequently, it must be seen to during the transmission of a signal that during the transmission of the last 0-bit of this signal a convertible combination is in the five-units memory M. The process of the tape reader R making a step and of transferring subsequently, the 5-units combination to the 5-units memory M takes as much time as the transmission of one bit.

If a signal consists e.g. of 12 bits, 12−1=11 unconvertible five-units combinations can be read and ignored, without causing mutilation of the Morse code text.

In the above, the letter "T" was mentioned as an example. In Morse code this letter is represented by one dash or six bits, namely 111000, when occurring within a word. The number of unconvertible signals that can be ignored without interrupting the Morse code text can be 6—1=5 in this case. It is supposed that at the appearance of a shift pulse this signal "T" is transferred from the code convertor C to the shift register S.

When the next shift pulse (for simplicity's sake designated as the first) appears, the first bit shifts from the register to the keyer K and at the same time a next signal is transferred from the five units memory M to the code convertor C. If this signal is an unconvertible one, for which there is no logic circuit in the code convertor C, it will be registered in the program processor P (trigger SH).

When the next (the second) shift pulse appears, the second bit shifts from the register S to the keyer K and as the preceding signal was not converted in the code convertor C, the program processor P causes a next signal to be transferred from the five-units memory M to the code convertor C. If this signal too is an unconvertible one, for which there is no logic circuit in the code convertor C, it is registered, and if necessary, processed in the program processor P.

When the next (the third) shift pulse appears, the third bit shifts from the register S to the keyer K, and as the preceding signal was not converted in the code convertor C, a next signal is transferred from the five-units memory M to the code convertor C. This fresh signal may be unconvertible too.

If this process goes on in this manner, the last bit will leave the register S at the sixth shift pulse. In order to prevent an interruption in the Morse code text, a next signal must now be transferred from the code convertor C to the shift register S; this must be a convertible signal. Thus five unconvertible signals can be dealt with without any interruption in the Morse code text occurring.

The keyer K (FIG. 2*d*)

The trigger SL keys the Morse signal. If the *q*-contacts are closed, this keying trigger is controlled by the shift register S or triggers BA through BT. In the case of open *q*-contacts, the trigger SL will send "reversals." If during the transmission of a signal, one or more *q*-contacts are opened, the control by the shift registers will not be interrupted until the last 0-bit of the signal has been transmitted. Then the "reversals" are transmitted.

When all the *q*-contacts are closed, the first signal to be transmitted will be preceded by four 0-bits, in order to prevent this signal from being received mutilated and to establish a sufficient separation between the end of the "reversals" and the Morse signal to be sent. This is effected by the triggers QA and QB (see FIG. 2*c*). Further, when the *q*-contacts are closed again, it is not the contacts are closed again, it is not the converted five-units combination lying in the reading station at that moment that is keyed, but the combination lying in the reading station before the opening of the *q*-contacts, since this combination was stored in the shift registers, before the transmission of the last signal was completed.

What is claimed is:

1. An apparatus for converting a multi-unit binary code into an uninterrupted Morse telegraph code comprising the following elements:
- (a) a reader for simultaneously reading all of the units of each signal of said binary code,
- (b) a memory connected to said reader for each of the binary code signals read by said reader,
- (c) a code convertor connected to said memory for converting said stored binary code signals into Morse code signals,
- (d) a shift register connected to said code convertor for said Morse code signals,
- (e) an output circuit connected to said shift register for the shifted Morse code signals, and
- (f) a program processor circuit connected to all of the above elements including:
  - (1) a clock pulse generator,
  - (2) a distributor connected to said generator for operating said shift register,
  - (3) means for detecting control signals from the reader, and
  - (4) means connected to said detecting means to cause said control signals to be ignored by said output circuit before the preceding Morse code signal has been completely shifted through said output circuit.

2. An apparatus according to claim 1 wherein said distributor in operating said shift register controls said means to ignore consecutive unconvertible signals from said binary code in a number at least equal to the number of bits in the last converted Morse code signal minus one.

3. An apparatus according to claim 1 wherein said processor includes means for automatically converting "line feed" signals of said binary code into "space" signals for between the letters of said Morse code, except when said "line feed" signal is preceded by a hyphen or a "space" signal.

4. An apparatus according to claim 1 wherein said tape reader includes means for indicating when no tape is to be read, and said processor includes means to complete the transmission of the last read signal before transmitting "reversal" signals.

5. An apparatus according to claim 1 wherein said processor includes means for automatically preceding every message by four 0-bit signals to prevent mutilation of the signals in the message to follow.

6. An apparatus according to claim 1 wherein said processor includes means for automatically generating sufficient 0-bit signals to produce a space between letters of the Morse code signals, whether or not the required number of such 0-bit signals have been converted after each letter from said binary code.

7. An apparatus according to claim 1 wherein said binary code is a five unit code and wherein said reader and memory each comprise five reading means and five storing means connected respectively together.

8. An apparatus according to claim 1 wherein said shift register comprises a series of nineteen triggers controlled by shift pulses from said distributor.

9. An apparatus according to claim 1 wherein said program processor comprises at least four trigger circuits connected in sequence.

10. An apparatus according to claim 1 wherein said program processor includes means for automatically commanding the stepping of said reader to the next signal after the first bit of the previous signal has been converted in the memory and moved in said shift register.

11. An apparatus according to claim 1 including means in said program processor for resetting said shift register after each Morse code signal has been transmitted by said keyer.

12. An apparatus according to claim 1 wherein said memory comprises a plurality of triggers corresponding to the number of units in said binary code.

13. An apparatus according to claim 1 wherein said code converter and said processor each comprise a plurality of logic circuits for detecting and converting the signals from said binary code.

14. An apparatus according to claim 1 wherein said processor includes means for counting the number of successive unconvertible signals in said binary code.

15. A system for transmission of uninterrupted Morse code signals from a five-unit mechanical code signal producer of more than just the signals of said Morse code, said system comprising:
- (a) means for generating said mechanical code signals,
- (b) means to store signals from said generating means,
- (c) means to convert only the Morse code signals read from said generating means into successive binary bits to form the dots and dashes and spaces between the dots and dashes of said Morse code, (d) means to register said converted bits, (e) means to successively transmit said registered bits, (f) means to detect the end of each letter by two spaces except when a space signal is converted, and (g) means to generate a "space" signal when needed between each letter such as when a "line feed" signal is detected from said generating means provided it is not preceded by a "space" or a "hyphen" signal.

16. A system according to claim 15 including means to detect the stored signals which are not to be converted while continuing the transmission of the registered bits.

References Cited

UNITED STATES PATENTS

| | | | |
|---|---|---|---|
| 1,557,633 | 8/1925 | Vernam | 178—26.5 |
| 3,195,122 | 7/1965 | Lorenz | 340—347 |
| 3,237,187 | 2/1966 | Malone et al. | 340—347 |
| 3,296,614 | 1/1967 | Gryk | 340—347 |
| 3,348,205 | 8/1967 | Lee | 340—347 |

JOHN W. CALDWELL, Primary Examiner

MARSHALL M. CURTIS, Assistant Examiner

U.S. Cl. X.R.

178—26.5

PO-1050
(5/69)

UNITED STATES PATENT OFFICE
CERTIFICATE OF CORRECTION

Patent No. 3,496,294 Dated Feb. 17, 1970

Inventor(s) E. J. EMANUELS

It is certified that error appears in the above-identified patent and that said Letters Patent are hereby corrected as shown below:

Column 1, line 43, "651247" should read -- 6512472 -- Column 2, line 17, "space" should be in quotation marks -- "space" -- Column 4, line 16, "7" should read -- 1 -- ; line 25, after "that" insert -- each -- ; line 53, "conductor" should read -- conductors --. Column 6, line 11, "11" should read -- 11' -- ; line 43, "KL" should read -- KL 3 -- ; line 53, "registers" should read -- register S -- ; line 57, "registers" should read -- register S --; line 60, "registers" should read -- register S --. Column 7, line 53, delete "contacts are closed again, it is not the" ; line 57, "registers" should read -- register S -- .

SIGNED AND
SEALED
JUL 21 1970

(SEAL)
Attest:

Edward M. Fletcher, Jr.
Attesting Officer

WILLIAM E. SCHUYLER, JR.
Commissioner of Patents